(12) United States Patent
Frattini et al.

(10) Patent No.: US 11,724,228 B2
(45) Date of Patent: Aug. 15, 2023

(54) GETTER ACTIVATION UNDER VACUUM

(71) Applicant: Whirlpool Corporation, Benton Harbor, MI (US)

(72) Inventors: Gustavo Frattini, St. Joseph, MI (US); Ashish Nigam, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/592,165

(22) Filed: Feb. 3, 2022

(65) Prior Publication Data

US 2022/0161181 A1 May 26, 2022

Related U.S. Application Data

(63) Continuation of application No. 16/302,958, filed as application No. PCT/US2017/066575 on Dec. 15, 2017, now Pat. No. 11,241,651.

(60) Provisional application No. 62/434,941, filed on Dec. 15, 2016.

(51) Int. Cl.

| | | |
|---|---|---|
| *B01D 53/02* | (2006.01) | |
| *B01D 53/04* | (2006.01) | |
| *F17C 3/08* | (2006.01) | |
| *F25D 23/06* | (2006.01) | |
| *H01J 7/18* | (2006.01) | |
| *B01J 20/04* | (2006.01) | |
| *B01J 20/06* | (2006.01) | |
| *B01J 20/28* | (2006.01) | |

(52) U.S. Cl.
CPC .......... *B01D 53/0407* (2013.01); *B01J 20/04* (2013.01); *B01J 20/041* (2013.01); *B01J 20/06* (2013.01); *B01J 20/2805* (2013.01); *B01J 20/28052* (2013.01); *F17C 3/08* (2013.01); *F25D 23/06* (2013.01); *H01J 7/18* (2013.01); *H01J 7/183* (2013.01); *H01J 7/186* (2013.01); *F25D 2201/14* (2013.01)

(58) Field of Classification Search
CPC ..... B01D 53/0407; B01J 20/04; B01J 20/041; B01J 20/06; B01J 20/2805; B01J 20/28052; F25D 2201/14; F25D 23/06; H01J 7/18; H01J 7/183; H01J 7/186
See application file for complete search history.

(56) References Cited

U.S. PATENT DOCUMENTS

| | | |
|---|---|---|
| 5,018,328 A | 5/1991 | Cur et al. |
| 5,091,233 A | 2/1992 | Kirby et al. |
| 5,273,801 A | 12/1993 | Barry et al. |
| 5,345,814 A | 9/1994 | Cur et al. |

(Continued)

FOREIGN PATENT DOCUMENTS

| | | |
|---|---|---|
| CN | 102974302 A | 3/2013 |
| CN | 103721670 B | 5/2015 |
| WO | 2010010563 A2 | 1/2010 |

*Primary Examiner* — Christopher P Jones
(74) *Attorney, Agent, or Firm* — Price Heneveld LLP (57) ABSTRACT

A vacuum insulated compartment includes an outer wrapper and an inner liner that is sealed to the outer wrapper. A cavity is defined therebetween. The cavity includes a negative pressure. An insulation material is disposed in the cavity. A getter assembly is disposed in the cavity and includes a primary getter material that is deposited on a plate. A cover layer is deposited over the primary getter material on the plate. A vessel is nested within the primary getter material. A secondary getter material is disposed within the vessel. A protective enclosure is disposed around the getter assembly.

18 Claims, 8 Drawing Sheets

(56) References Cited

U.S. PATENT DOCUMENTS

| | | | |
|---|---|---|---|
| 5,505,810 | A | 4/1996 | Kirby et al. |
| 5,532,034 | A | 7/1996 | Kirby et al. |
| 6,200,494 | B1 | 3/2001 | Manini et al. |
| 7,578,392 | B2 | 8/2009 | Brooks et al. |
| 9,840,042 | B2 | 12/2017 | Allard et al. |
| 2006/0076863 | A1 | 4/2006 | Echigoya et al. |
| 2007/0037007 | A1 | 2/2007 | Conte et al. |
| 2008/0286515 | A1 | 11/2008 | Jung et al. |
| 2013/0142983 | A1 | 6/2013 | Han et al. |
| 2013/0305928 | A1 | 11/2013 | Kojima et al. |
| 2015/0017489 | A1 | 1/2015 | Visconti et al. |
| 2015/0068401 | A1 | 3/2015 | Hashida |
| 2016/0136612 | A1 | 5/2016 | Sato et al. |

GETTER ACTIVATION UNDER VACUUM

CROSS-REFERENCE TO RELATED APPLICATION

This application is a continuation of U.S. application Ser. No. 16/302,958, filed on Nov. 19, 2018, now U.S. Pat. No. 11,241,651, entitled "GETTER ACTIVATION UNDER VACUUM," which claims priority to and is a National Stage of International Application No. PCT/US2017/066575, filed on Dec. 15, 2017, entitled "GETTER ACTIVATION UNDER VACUUM," which claims priority to and the benefit under 35 U.S.C. § 119(e) of U.S. Provisional Application No. 62/434,941, filed on Dec. 15, 2016, entitled "BETTER ACTIVATION UNDER VACUUM," the disclosures of which are hereby incorporated herein by reference in entirety.

BACKGROUND OF THE DISCLOSURE

The present disclosure generally relates to an activation system, and more particularly to a getter activation under vacuum system.

FIELD OF THE DISCLOSURE

There is no solution to activate a getter after evacuation. This disclosure solves this problem, creating the possibility to expose (open) the getter after (or during) evacuation.

SUMMARY OF THE DISCLOSURE

According to one aspect of the present disclosure, a vacuum insulated compartment includes an outer wrapper and an inner liner that is sealed to the outer wrapper. A cavity is defined therebetween. The cavity includes a negative pressure. An insulation material is disposed in the cavity. A getter assembly is disposed in the cavity and includes a primary getter material that is deposited on a plate. A cover layer is deposited over the primary getter material on the plate. A vessel is nested within the primary getter material. A secondary getter material is disposed within the vessel. A protective enclosure is disposed around the getter assembly.

According to another aspect of the present disclosure, a vacuum insulated refrigerator includes an inner liner that is sealed to an outer wrapper and defines a cavity therebetween under vacuum. A primary getter material is deposited within a getter container. The vacuum insulated refrigerator also includes a secondary getter material. A tertiary getter material is disposed within the getter container. The secondary getter material covers the tertiary getter material. A cover layer is deposited over the primary getter material within the container. The primary getter material is partially nested within the cover layer.

According to yet another aspect of the present disclosure, a refrigerator includes a cabinet that defines a vacuum sealed cavity and a getter assembly disposed in the cavity. The getter assembly includes a first getter material. A cover layer is deposited over the first getter material. A vessel includes a second getter material. The second getter material is at least partially nested within the first getter material.

These and other features, advantages, and objects of the present disclosure will be further understood and appreciated by those skilled in the art by reference to the following specification, claims, and appended drawings.

DETAILED DESCRIPTION OF EMBODIMENTS

Figure 1:
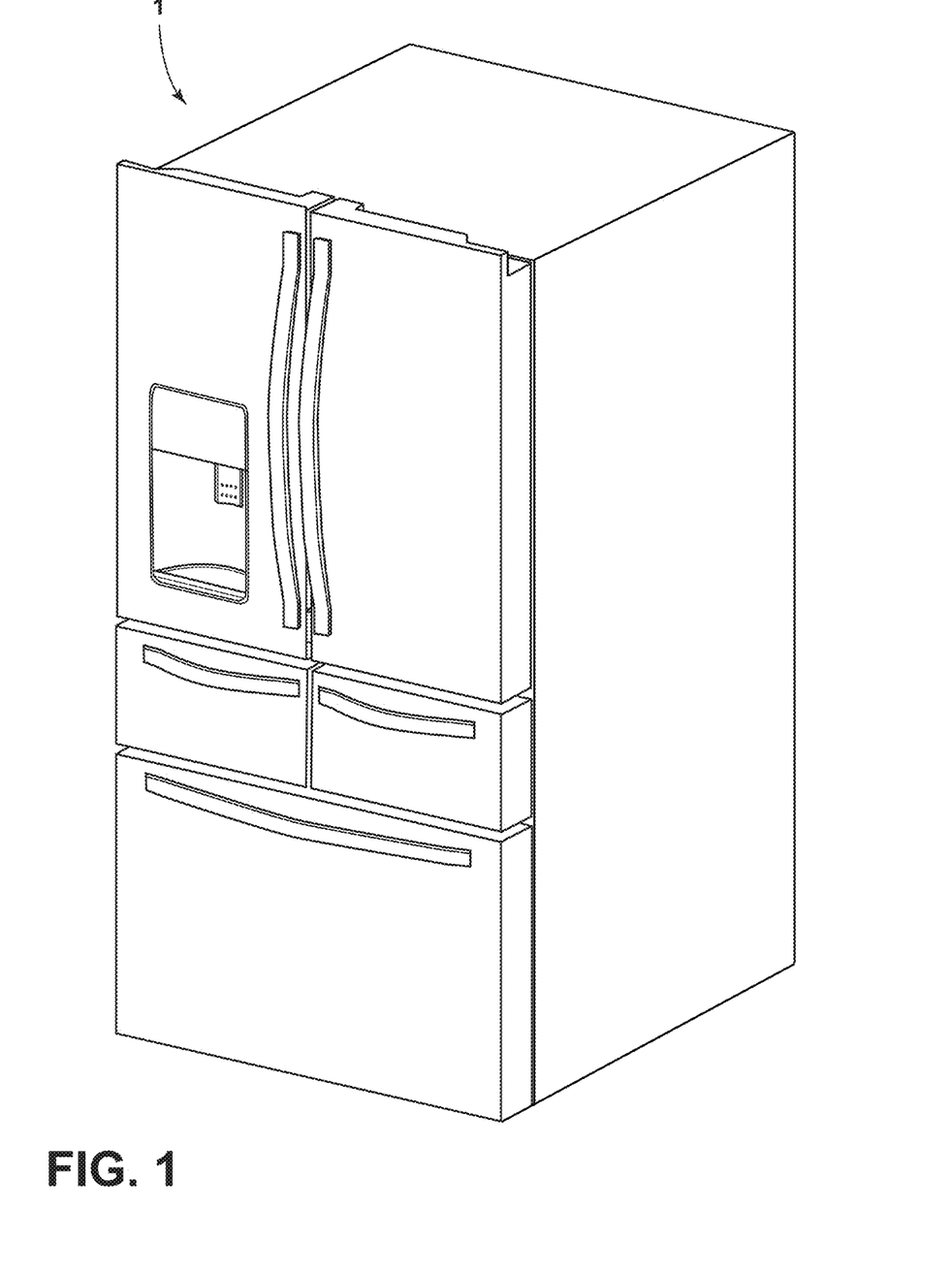
FIG. 1 is a top perspective view of an appliance configured to use any of the getter assemblies disclosed herein.
Figure 2A:
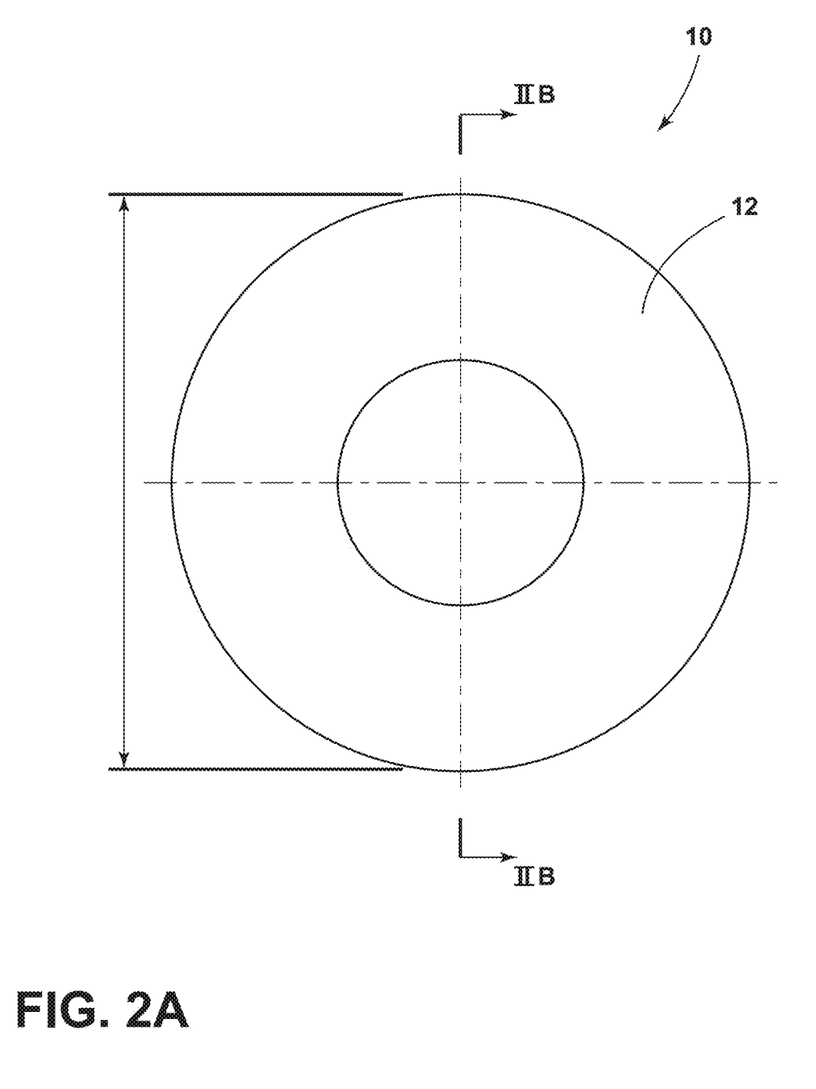
FIG. 2A is a bottom plan view of one embodiment of a getter assembly of the present disclosure.
Figure 2B:
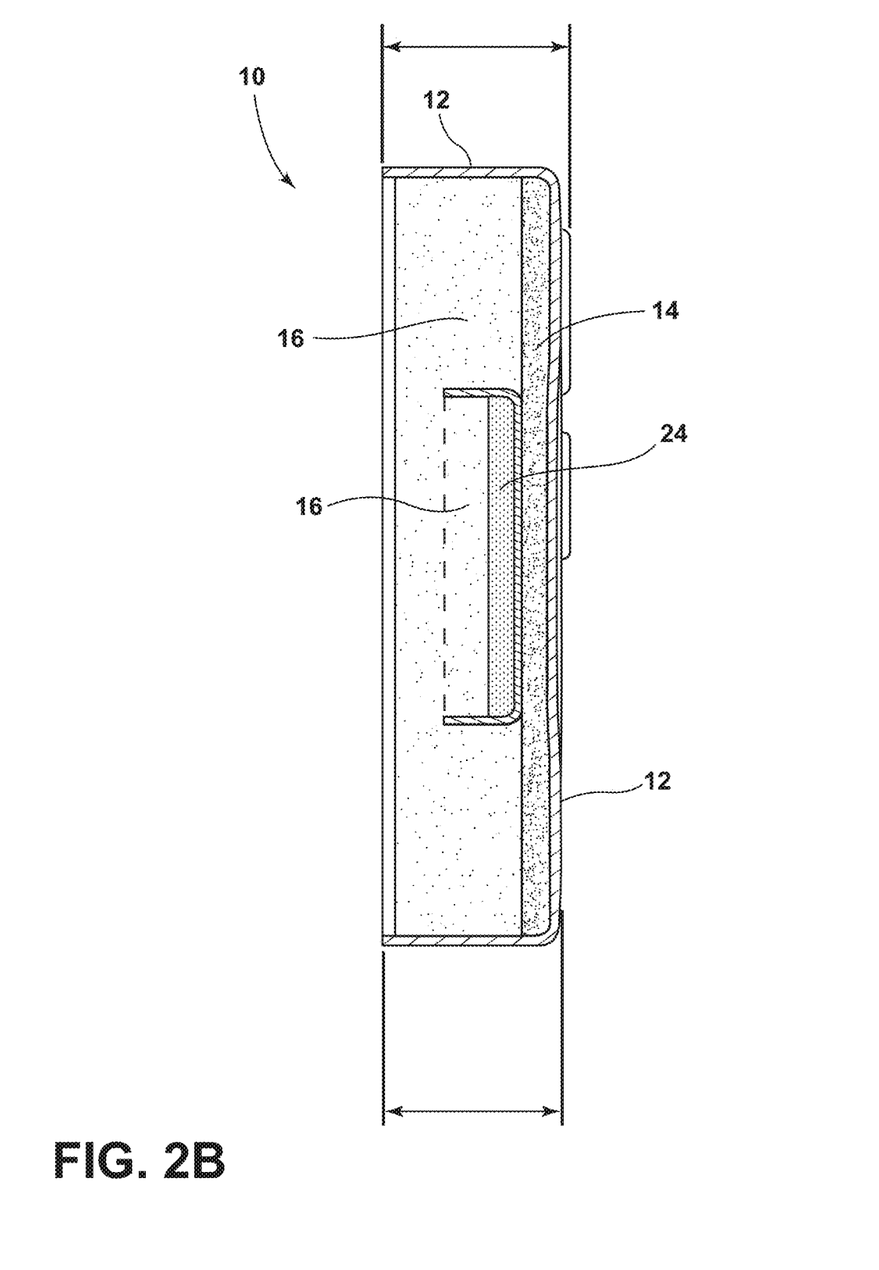
FIG. 2B is a side cross-sectional view of the getter assembly of FIG. 1.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-24, reference numeral 10 generally designates a getter assembly for a vacuumed compartment, such as a refrigerator body 1 (FIG. 1). The getter assembly 10 includes a container 12. A getter material 14 is deposited within the container 12. A cover layer 16 is deposited over the getter material 14 within the container 12. It will be understood that the vacuumed compartment could be an appliance cabinet, a vacuumed insulation panel, a vacuumed insulation system, etc.

Currently, it is necessary to open the getter packing before starting evacuation. For this reason, the existing getters consider a time up to 15 minutes of working time. In some cases, this 15 minutes time frame is not enough to install the getter in the product and achieve the final vacuum pressure, which restricts the possible locations of the getter in the product. For example, in the case of a refrigerator, the best location to install a getter is in the area of the machine compartment, but it is not possible to install the getter in the machine compartment and finish evacuation within 15 minutes. For cases that need more than 15 minutes, it is necessary to use more getters to overcome the excessive working time.

This disclosure brings the opportunity to activate the existing getters, with no changes in their chemistry, during or after the system evacuation. The idea is to create an enclosure that is capable to be opened when it is inside the structure, during or after the system evacuation. This enclosure can be made of glass or plastic or any other material that can be broken or perforated. The getter inside the enclosure can be under vacuum or in an inert gas atmosphere. If the getter is under vacuum inside the enclosure, the enclosure can be opened (broken or perforated) either during evacuation or after evacuation. If the getter is under an inert gas atmosphere inside the enclosure, the enclosure has to be opened (broken or perforated) during evacuation. If the enclosure is glass or other rigid and brittle material, the enclosure has to be installed facing an external wall and can be opened (broken) with an impact from outside. If the enclosure is plastic or other flexible material, the enclosure has to be installed in front of the vacuum port and can be perforated by a needle or a set of needles through the vacuum port, during or after evacuation. As previously noted, the getters set forth herein are configured to absorb released gases disposed within vacuumed spaced in an appliance, such as a refrigerator 1 (FIG. 1).

With reference again to FIGS. 2A and 2B, the illustrated embodiment includes the container 12, which may include a stamped or otherwise printed indicia of the source of the getter assembly 10. The container 12 may be constructed of a variety of metals, including stainless steel. In addition, the container 12 is configured to house two different getter materials, the first getter material 14 is disposed along a bottom wall 20 of the container 12. The separate vessel 22 includes a second getter material 24 disposed along a bottom wall 26 of the vessel 22. It is generally contemplated that the vessel 22 may be spaced a predetermined distance from the bottom wall 20 of the container 12. In addition, it is contemplated that a top portion of both the vessel 22 and the container 12 are filled with the cover layer 16 that prevents premature activation of the getter assembly 10.

Figure 3A:
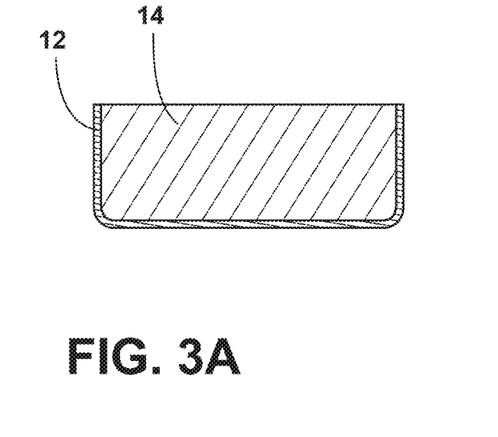
FIG. 3A is a side cross-sectional view of a getter assembly of the present disclosure.
Figure 3B:
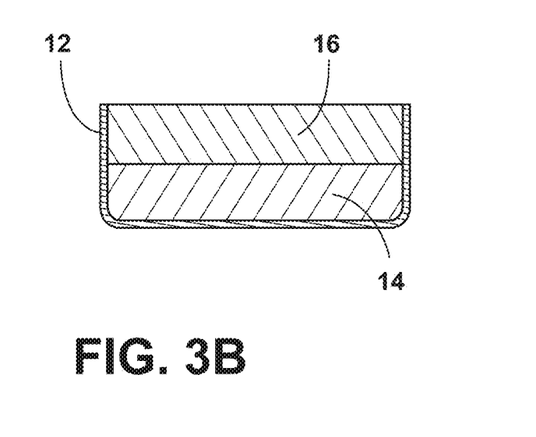
FIG. 3B is a side cross-sectional view of a getter assembly of the present disclosure.

With reference now to FIGS. 3A-7, alternate constructions of a getter assembly 10 are illustrated. In FIG. 3A, a getter assembly 10 that includes only one getter material 14 is illustrated. The getter material 14 is filled within the confines of the container 12, although the getter material 14 may fill less than the total volume of the container 12. FIG. 3B illustrates a non-hazardous material, possibly a desiccant, disposed over the getter material 14. The non-hazardous material defines a cover layer 16 designed to prevent premature exposure of the getter material 14. The cover layer 16 may be configured to slowly erode away or evaporate, thereby exposing the getter material 14 underneath. The getter material 14 may include a variety of materials, including cobalt, lithium, barium, etc. In addition, the getter material 14 may be comprised of $BaLi_4$, $CaO$, or $Co_3O_4$.

Figure 4:
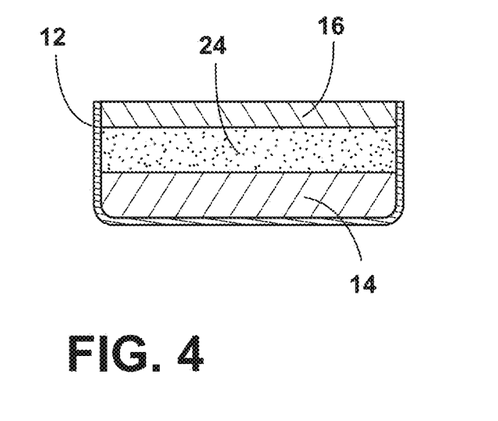
FIG. 4 is a side cross-sectional view of a getter assembly of the present disclosure.

With reference now to FIG. 4, another form of a getter assembly 10 is illustrated that includes a cover layer 16 constructed from a non-hazardous material, and a first getter material 14 and a second getter material 24 disposed below the cover layer 16. The first getter material 14 may have a first predetermined activation time and the second getter material 24 may have a second predetermined activation time.

Figure 5:
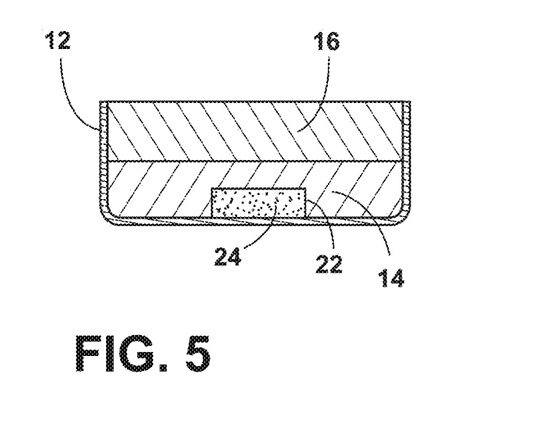
FIG. 5 is a side cross-sectional view of a getter assembly of the present disclosure.

FIG. 5 illustrates yet another construction with a non-hazardous cover layer 16 disposed over a first, or primary, getter material 14, and a second, or secondary, getter material 24 disposed within a small vessel 22 disposed inside the container 12. It will be understood that the terms "first" and "primary" are interchangeable throughout the application and claims, as well as the terms "second" and "secondary." The small vessel 22 may be open on a top or side of the small vessel 22 so that exposure of the second getter material 24 occurs after the first getter material 14 has eroded or evaporated.

Figure 6:
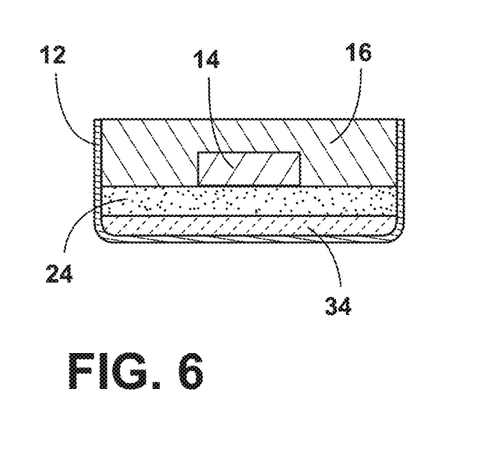
FIG. 6 is a side cross-sectional view of a getter assembly of the present disclosure.

FIG. 6 illustrates another embodiment that includes a non-hazardous cover layer 16 disposed over a vessel 22 that contains a getter material 14. Second and third getter materials 24, 34 are disposed below the top getter material 14 disposed in the vessel 22. The second and third getter materials 24, 34 are aligned along the bottom wall 20 of the container 12. As with the other embodiments set forth herein, each getter material may be configured to eliminate particular gases within the vacuumed space of an appliance, such as a refrigerator. When a particular gas molecule comes in contact with the appropriate getter material, the getter material combines with the gas molecule either chemically or by absorption.

Figure 7:
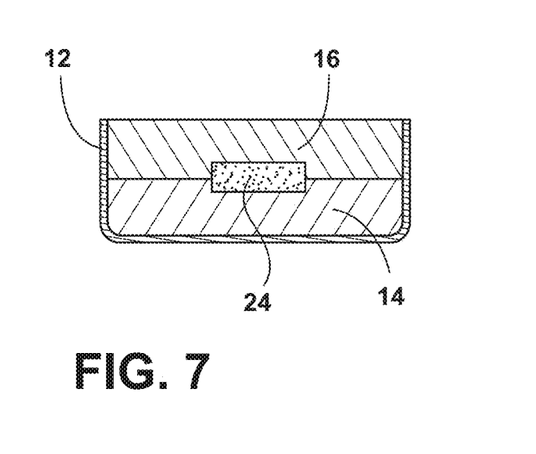
FIG. 7 is a side cross-sectional view of a getter assembly of the present disclosure.

FIG. 7 illustrates yet another embodiment that includes a cover layer 16 disposed over a first getter material 14 and a second getter material 24 disposed inside a vessel 22 generally disposed between the cover layer 16 and the first getter material 14. In this instance, the getter material 24 may act as a transitional getter material that facilitates transition from the getter material 24 to the getter material 14.

Figure 8:
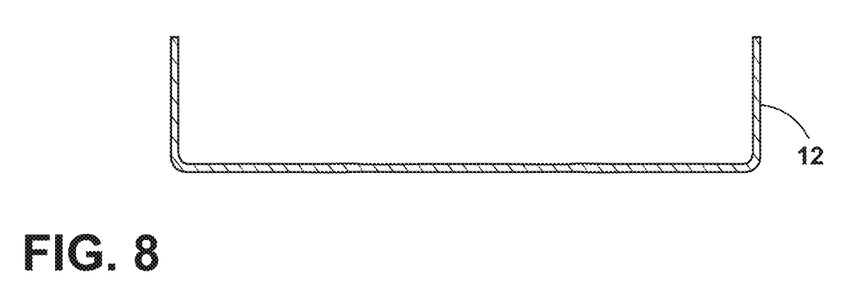
FIG. 8 is a side elevational cross-sectional view of a container for a getter assembly.
Figure 9:
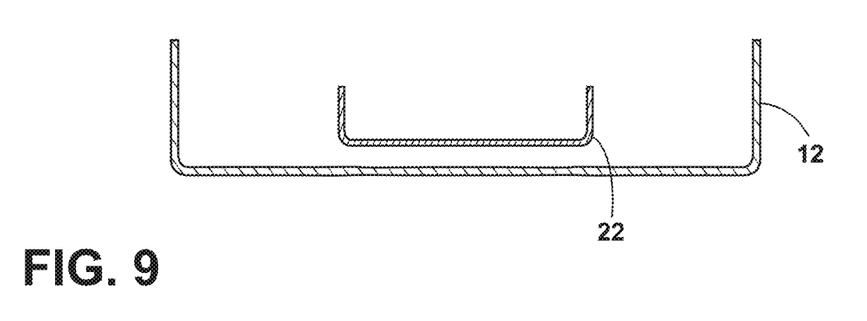
FIG. 9 is a side elevational cross-sectional view of a container with a small vessel disposed therein.
Figure 10:
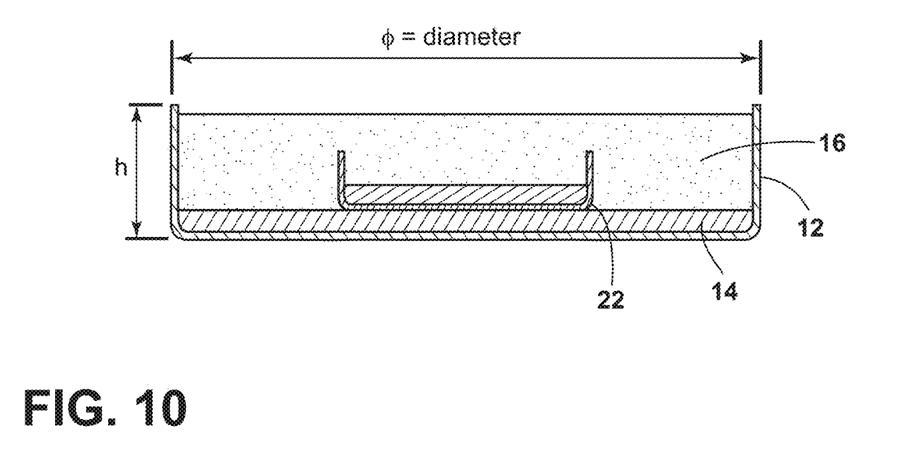
FIG. 10 is a side cross-sectional view of the small vessel and container with a getter material installed to define a getter assembly.

With reference to FIGS. 8-10, an assembly is generally illustrated that includes a container 12 of (FIG. 8) configured for use with a getter material 14. In FIG. 9, the small vessel 22 is disposed inside the container 12, the vessel 22 being configured to receive a getter material 14. In FIG. 10, the first getter material 14 is disposed on the bottom wall 20 of the container 12 and a second getter material 24 is disposed on a bottom wall 26 of the vessel 22. The cover layer 16 is then disposed over both getter materials 14, 24 within the container 12 and the vessel 22. The vessel 22 may be installed after the first getter material 14 is provided in the container 12 or may be attached to at least one side wall of the container 12.

Figures 11, 12:
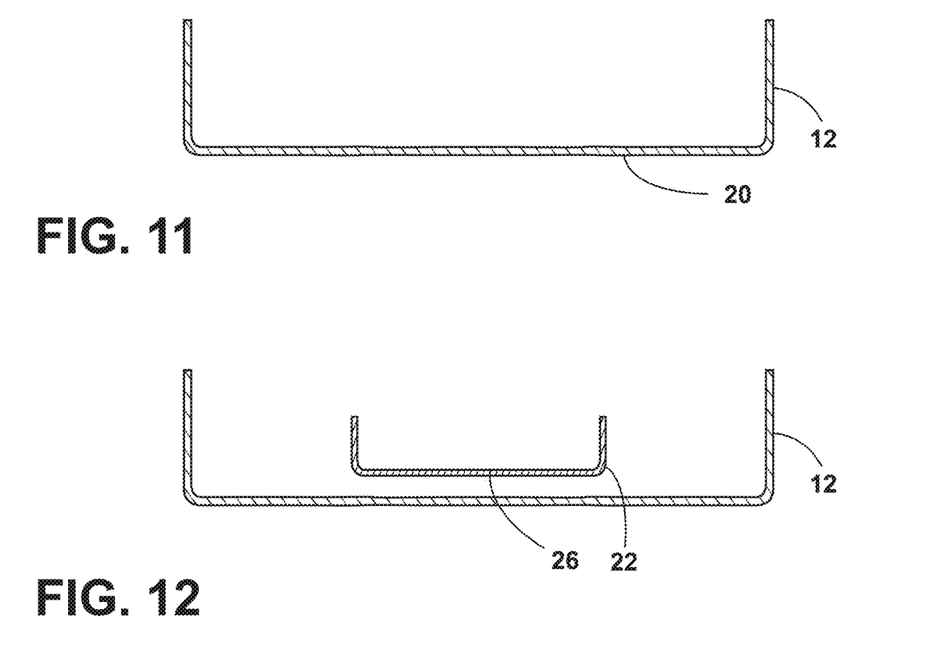
FIG. 11 is a side elevational cross-sectional view of a container for a getter assembly.
FIG. 12 is a side elevational cross-sectional view of a container with a small vessel disposed therein.
Figure 13:
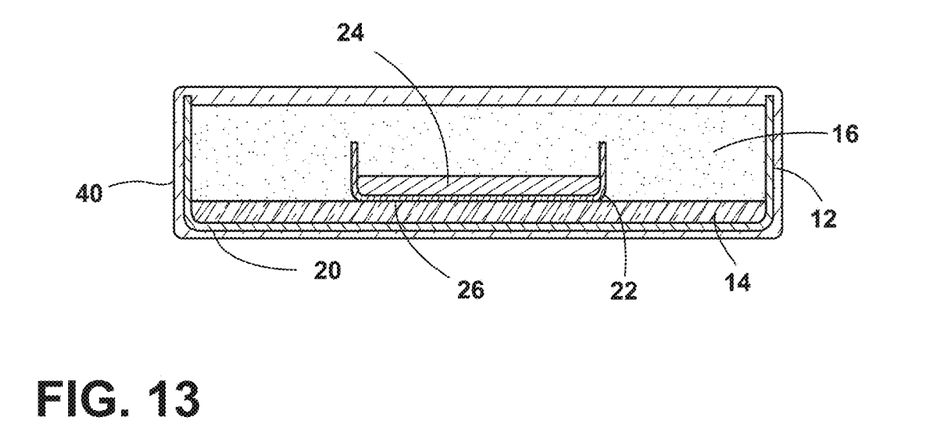
FIG. 13 is a side cross-sectional view of a getter assembly with a glass or wrapping disposed around the getter assembly.

With reference now to FIGS. 11-13, an assembly is generally illustrated that includes the container 12 of (FIG. 11) configured for use with the getter material 14. In FIG. 12, the small vessel 22 is disposed inside the container 12, the vessel 22 being configured to receive a getter material 24. In FIG. 13, a getter material 14 is disposed on a bottom wall 20 of the container 12 and a second getter material 24 is disposed on a bottom wall 26 of the vessel 22. The cover layer 16 is then disposed over both the first and second getter materials 14, 24 within the container 12 and the getter material 14 within the vessel 22. After the components of the getter assembly 10 have been fully installed, a protective enclosure 40 is disposed around the getter assembly 10 as a whole. The protective enclosure 40 may be constructed of substantially chemically inactive or inert materials, including some polymeric materials and glass, for example.

Figure 14:
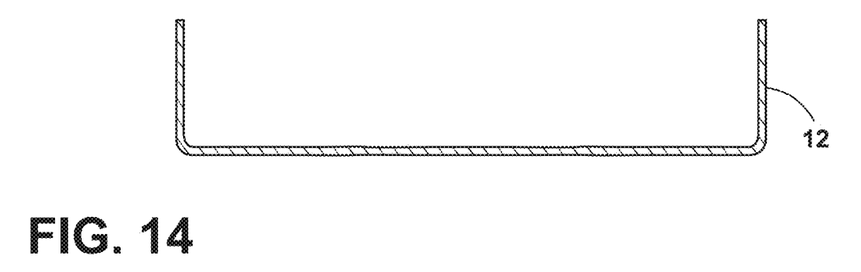
FIG. 14 is a side elevational cross-sectional view of a container for a getter assembly.
Figure 15:
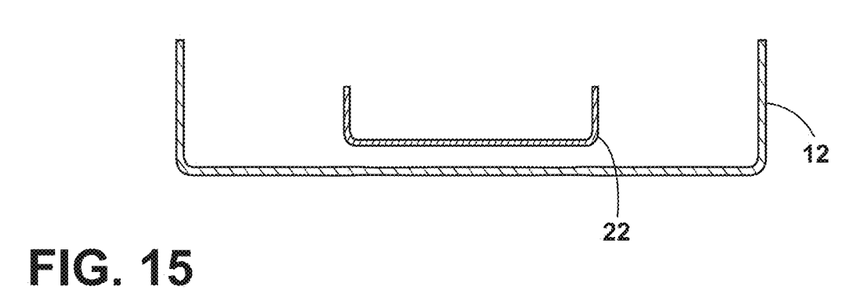
FIG. 15 is a side elevational cross-sectional view of a container with a small vessel disposed therein.
Figure 16:
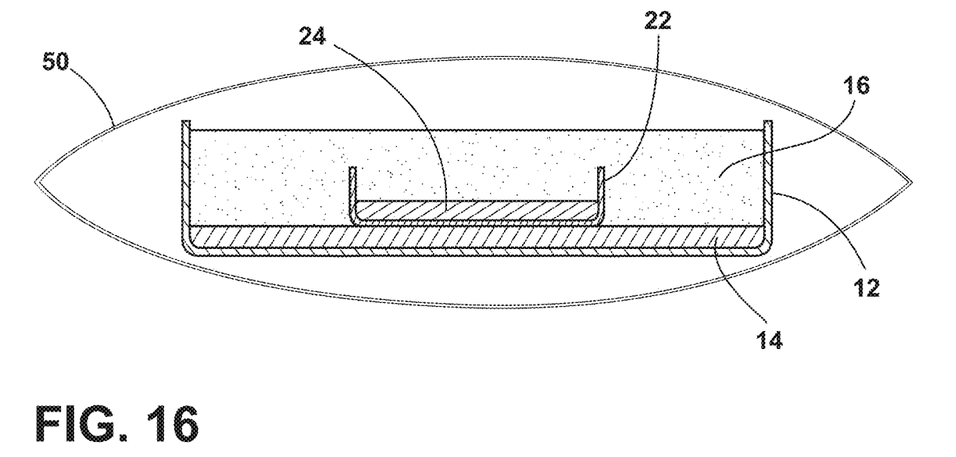
FIG. 16 is a side cross-sectional view of a getter assembly disposed inside a bag.

With reference now to FIGS. 14-16, the illustrated getter assembly 10 includes a container 12 of (FIG. 14) configured for use with a getter material 14. In FIG. 15, the small vessel 22 is disposed inside the container 12, the vessel 22 being configured to receive a getter material 24. In FIG. 16, the getter material 14 is disposed on a bottom wall 20 of the container 12 and the second getter material 24 is disposed on a bottom wall 26 of the vessel 22. The cover layer 16 is then disposed over both getter materials 14, 24 within the container 12 and the vessel 22. After the getter assembly 10 is complete, a bag enclosure 50 is disposed around the getter assembly 10 as a whole and filled with argon. The bag enclosure 50 may be constructed of a material that breaks down over a period of time or upon exposure to a particular gas.

Figure 17:
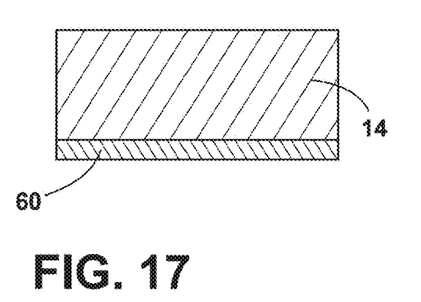
FIG. 17 is a side cross-sectional view of a getter assembly of the present disclosure.
Figure 18:
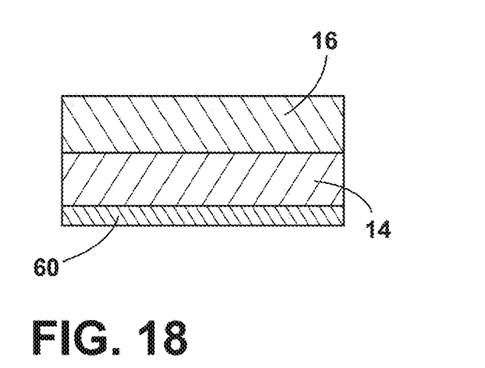
FIG. 18 is a side cross-sectional view of a getter assembly of the present disclosure.
Figure 19:
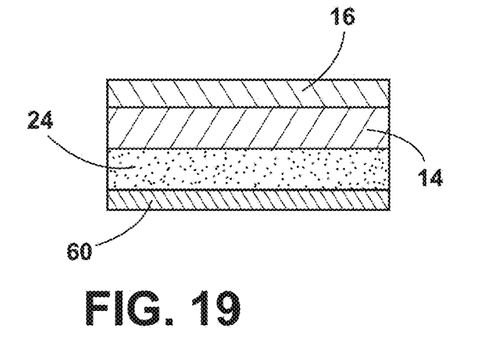
FIG. 19 is a side cross-sectional view of a getter assembly of the present disclosure.
Figure 20:
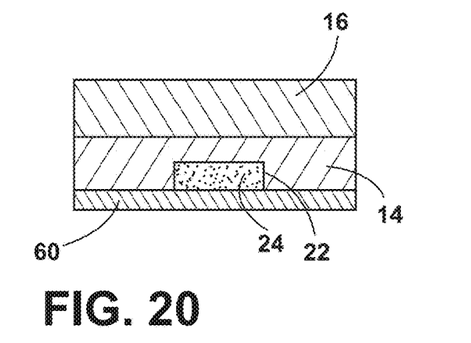
FIG. 20 is a side cross-sectional view of a getter assembly of the present disclosure.
Figure 21:
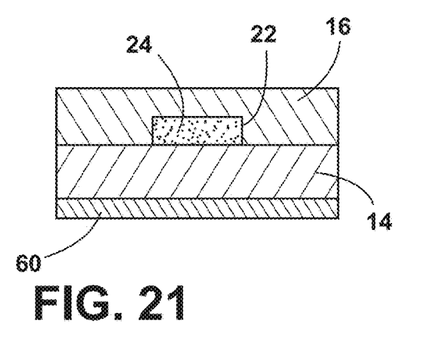
FIG. 21 is a side cross-sectional view of a getter assembly of the present disclosure.
Figure 22:
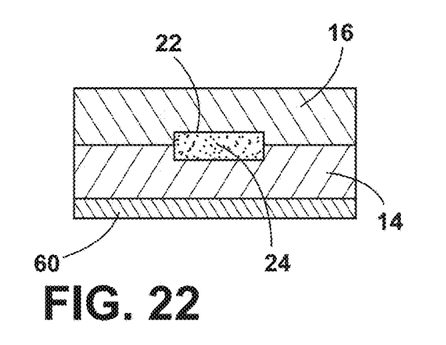
FIG. 22 is a side cross-sectional view of a getter assembly of the present disclosure.

With reference now to FIG. 17, yet another embodiment of a getter assembly 10 of the present disclosure is illustrated, which includes the getter material 14 disposed directly on a plate 60. FIG. 18 illustrates the cover layer 16 disposed on the getter material 14, which is in turn disposed on the plate 60. FIG. 19 illustrates the cover layer 16 disposed over two getter materials 14, 24, which are then disposed on the plate 60. FIG. 20 illustrates the getter material 14 disposed on the plate 60 and a small vessel 22 disposed on the plate 60. A second getter material 24 is disposed within the vessel 22. A cover layer 16 is disposed over both the getter material 24 on the plate 60 and the getter material 14 within the vessel 22. FIG. 21 illustrates a cover layer 16 disposed over a getter material 14 disposed on a plate 60 and a getter material 24 disposed within a vessel 22. FIG. 22 illustrates the first getter material 14 disposed on the plate 60 and the second getter material 24 disposed within the vessel 22 on top of the first getter material 14. The vessel 22 and the second getter material 24 are generally nested within the first getter material 14. A cover layer 16 is then disposed over both getter materials 14, 24.

Figure 23:
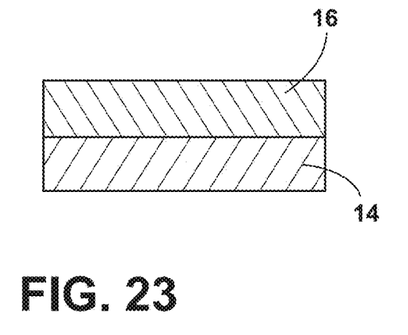
FIG. 23 is a side cross-sectional view of a getter assembly without a container or a vessel of the present disclosure.
Figure 24:
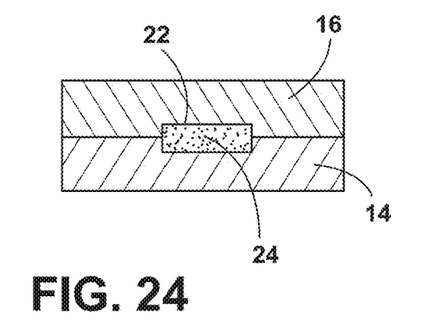
FIG. 24 is a side cross-sectional view of a getter assembly without a container or a vessel of the present disclosure.

FIGS. 23 and 24 illustrate a getter material 14 covered by a cover layer 16 (FIG. 23). FIG. 24 illustrates a cover layer 16 disposed over a small vessel 22 with a first getter material 14 disposed therein and a lower getter material 24 disposed underneath the vessel 22 and the cover layer 16.

An example of the getter characteristics of this disclosure generally includes a minimum total getter weight (mass) is 5.8 g. A minimum active getter (mass) is 0.09 g $BaLi_4$, 0.45 g $Co_3O_4$, and 2.7 g CaO. An initial sorption flow is greater than or equal to $10^{-6}$ torr 1/s. A total sorption capacity (active gases) is greater than or equal to 10 torr 1.

One method of utilizing the getter assemblies as set forth herein includes providing an appliance or vacuumed insulation panel and placing the getter assembly inside the appliance or vacuumed insulation panel. The appliance or vacuumed insulation panel are then placed in vacuum and are generally inactive during the vacuum. However, the getter assembly could be activated during the vacuum event. During or after the appliance or vacuumed insulation panel has been placed in vacuum, the protective enclosure or bag enclosure is ruptured, thereby exposing the getter material to the vacuumed space defined by the appliance or vacuumed insulation panel. The getter material is then available to react with gas molecules chemically or by absorption. Accordingly, small amounts of gas are removed from the evacuated space by the getter material of the getter assembly. By providing the protective enclosure or bag enclosure around the getter assembly materials, the getter material can be maintained with limited or minimal exposure to gases before the getter assembly is sealed inside the vacuumed space.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its form, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vacuum insulated compartment comprising:
   an outer wrapper;
   an inner liner sealed to the outer wrapper and defining a cavity therebetween, wherein the cavity includes a negative pressure;
   an insulation material disposed in the cavity; and
   a getter assembly disposed in the cavity, the getter assembly comprising:
      a primary getter material deposited on a plate;
      a cover layer deposited over the primary getter material on the plate;
      a vessel nested within the primary getter material, wherein a secondary getter material is disposed within the vessel; and
      a protective enclosure disposed around the getter assembly.

2. The vacuum insulated compartment of claim 1, wherein the secondary getter material has a total volume less than a total volume of the primary getter material.

3. The vacuum insulated compartment of claim 2, wherein the secondary getter material is also nested within the primary getter material.

4. The vacuum insulated compartment of claim 1, wherein the protective enclosure is a bag that extends around the getter assembly.

5. The vacuum insulated compartment of claim 1, wherein an outermost surface of the secondary getter material is disposed further from the plate than an outermost surface of the primary getter material.

6. The vacuum insulated compartment of claim 1, wherein the vessel is in abutting contact with the plate.

7. The vacuum insulated compartment of claim 1, wherein a total getter mass of the getter assembly is at least 5.8 grams.

8. A vacuum insulated refrigerator comprising:
   an inner liner sealed to an outer wrapper and defining a cavity therebetween under vacuum;
   a primary getter material deposited within a getter container;
   a secondary getter material;
   a tertiary getter material disposed within the getter container, wherein the secondary getter material covers the tertiary getter material; and
   a cover layer deposited over the primary getter material within the container, wherein the primary getter material is partially nested within the cover layer.

9. The vacuum insulated refrigerator of claim 8, wherein a bag enclosure is disposed around the getter container.

10. The vacuum insulated refrigerator of claim 8, wherein the cover layer is covered by a protective enclosure.

11. The vacuum insulated refrigerator of claim 8, further comprising:
    a vessel disposed within the getter container; the vessel configured to receive the primary getter material.

12. The vacuum insulated refrigerator of claim 11, wherein the getter container includes at least one sidewall and a bottom wall, and wherein the vessel is spaced a predetermined distance from the at least one sidewall and the bottom wall.

13. The vacuum insulated refrigerator of claim 8, wherein the primary getter material has a total volume less than a total volume of the secondary getter material.

14. A refrigerator comprising:
    a cabinet defining a vacuum sealed cavity; and
    a getter assembly disposed in the cavity, the getter assembly including:
       a first getter material;
       a cover layer deposited over the first getter material; and
       a vessel including a second getter material, wherein the second getter material is at least partially nested within the first getter material.

15. The refrigerator of claim 14, further comprising:
    a container that includes at least one sidewall and a bottom wall, wherein the vessel is spaced a predetermined distance from the at least one sidewall and the bottom wall.

16. The refrigerator of claim 14, wherein the cover layer is generally inert and protects premature activation of the first getter material.

17. The refrigerator of claim 14, wherein the second getter material has a total volume less than a total volume of the first getter material.

18. The refrigerator of claim 15, wherein the second getter material and the first getter material abut an inside surface of the container.

* * * * *